United States Patent
Gladstone et al.

(10) Patent No.: US 8,473,757 B2
(45) Date of Patent: Jun. 25, 2013

(54) PROTECTING DIGITAL DATA SUCH AS IMAGES ON A DEVICE WITH IMAGE ACQUISITION CAPABILITIES

(75) Inventors: Philip John Steuart Gladstone, Carlisle, MA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 880 days.

(21) Appl. No.: 12/388,387

(22) Filed: Feb. 18, 2009

(65) Prior Publication Data

US 2010/0211799 A1 Aug. 19, 2010

(51) Int. Cl.
*G06F 21/00* (2006.01)

(52) U.S. Cl.
USPC ............................................. 713/193; 380/45

(58) Field of Classification Search
USPC ................. 713/189, 193; 380/42, 43, 45, 281
See application file for complete search history.

(56) References Cited

U.S. PATENT DOCUMENTS

| | | | | |
|---|---|---|---|---|
| 5,898,779 A * | 4/1999 | Squilla et al. | ................. | 713/176 |
| 2003/0059051 A1 | 3/2003 | Hatano et al. | | |
| 2006/0036864 A1 * | 2/2006 | Parulski et al. | ............... | 713/176 |
| 2007/0150742 A1 * | 6/2007 | Cukier et al. | ................. | 713/182 |
| 2008/0279372 A1 * | 11/2008 | Farrugia et al. | ................. | 380/45 |

OTHER PUBLICATIONS

Krawczyk et al., "HMAC: Keyed-Hashing for Message Authentication," The Internet Society, RFC 2104, Feb. 1997, 11 pages.

* cited by examiner

*Primary Examiner* — Jung Kim
*Assistant Examiner* — Ghodrat Jamshidi
(74) *Attorney, Agent, or Firm* — The Law Office of Kirk D. Williams (57) ABSTRACT

Digital data, such as images on a digital camera, is typically protected (e.g., encrypted and/or authenticated) based on a master key stored off the device. The original master key can be acquired in a number of different ways, including being generated by the device or by another device. A one-way, progressive series of keys are derived from the master key such that only images or data of a same session can be authenticated or decrypted for viewing, export or manipulation of the decrypted image/data. In order to decrypt images or data of a previous session on the device, the master key must be imported to the device, such as by, but not limited to, taking a picture of a representation of the key and interpreting the image to reacquire the master key.

22 Claims, 4 Drawing Sheets

PROTECTING DIGITAL DATA SUCH AS IMAGES ON A DEVICE WITH IMAGE ACQUISITION CAPABILITIES

TECHNICAL FIELD

The present disclosure relates generally to secure digital images on an image acquisition device, such as, but not limited to a digital camera.

BACKGROUND

Devices with image acquisition components are in wide spread use for taking pictures of family events, news events, and even political events. They are also used for personal and home protection. Examples of these image acquisition devices include, but are not limited to, digital still or movie camera, video surveillance camera, a laptop or desktop personal computer with camera, cellular or other mobile phones. Because of the personal nature of some of the acquired images, it may be desirable to limit the access to some or all of the images.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with protecting digital data such as images on a device which typically has image acquisition capabilities. Such embodiments typically prevent, or at least reduce the ability of, any possessor of equipment to access and/or modify (e.g., change, insert) data (e.g., images) stored thereon through the use of encryption technology for encrypting and/or authenticating data. Therefore, one embodiment protects (e.g., encrypts and/or authenticates) data from being available to unauthorized users; and one embodiment provides authentication of data for verification of its integrity. Additionally, one embodiment relies on an encryption key available only from a specific location, to prevent the accessing of the stored data by an unauthorized user or even by an authorized user, whether desired or in response to a coercive force.

One embodiment includes an apparatus, comprising: an image acquisition element configured for acquiring digital images; storage configured for storing data, including said digital images; and an encryption mechanism configured for generating, using a cryptographic function, a one-way, progressive series of keys derived from a master key, and configured for encrypting or authenticating said digital images; wherein each particular key of the progressive series of keys is associated with a different session of a plurality of sessions, with said particular key being the basis for encrypting or authenticating images in said session associated with the particular key to produce encrypted or authenticated images.

One embodiment includes a processing element for interpreting one or more digital images of said acquired digital images to produce the master key. One embodiment includes an interface configured for exporting a representation of the master key which subsequently can be said acquired and said interpreted to produce the master key for use in decrypting or authenticating, by said encryption mechanism, said encrypted or authenticated digital images. In one embodiment, the apparatus initially generates the master key. One embodiment includes an image display; and display element configured for displaying images; wherein images of said encrypted or authenticated images are decrypted or authenticated based on said master key produced by interpreting one or more acquired images of the exported representation of the master key. In one embodiment, said exported representation of the master key is an image; and wherein said acquired image is said interpreted to produce the master key is a captured image of the printed or displayed image of the exported representation of the master key. In one embodiment, the master key is immediately deleted from the apparatus after producing a first key in the progressive series of keys. One embodiment includes an image display; and display element configured for displaying images; wherein only images in the current session corresponding to the current key of the progressive series of keys can be decrypted or authenticated for display. In one embodiment, the apparatus is configured: to initially generate the master key; to export a representation of the master key; and to import and interpret the representation of the master key to produce the master key for use in decrypting or authenticating, by said encryption mechanism, said encrypted or authenticated digital images.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Digital data, such as images on a digital camera, is typically protected (e.g., encrypted and/or authenticated) based on a master key stored off the device. The original master key can be acquired in a number of different ways, including being generated by the device or by another device. A one-way, progressive series of keys are derived from the master key such that only images or data of a same session can be decrypted for viewing, export or manipulation of the decrypted image/data. In order to decrypt images or data of a previous session on the device, the master key must be imported to the device, such as by, but not limited to, taking a picture of a representation of the key and interpreting the image to reacquire the master key. Note, this same technique can be used in protecting other types of data, such as audio recordings on a sound recording device.

One embodiment includes an apparatus, comprising: an image acquisition element configured for acquiring digital images; storage configured for storing data, including said digital images; and an encryption mechanism configured for generating, using a cryptographic function, a one-way, progressive series of keys derived from a master key, and configured for encrypting or authenticating said digital images; wherein each particular key of the progressive series of keys is associated with a different session of a plurality of sessions, with said particular key being the basis for encrypting or authenticating images in said session associated with the particular key.

One embodiment includes a processing element for interpreting a digital image of said digital images to produce the master key. One embodiment comprises an interface configured for exporting a representation of the master key which subsequently can be said acquired and said interpreted to produce the master key for use in decrypting, by said encryption mechanism, said encrypted digital images. In one embodiment, the apparatus initially generates the master key. One embodiment includes an image display; and display element configured for displaying images; wherein images of said encrypted images are decrypted based on said master key produced by interpreting an acquired image of the exported representation of the master key. In one embodiment, said exported representation of the master key is an image; and wherein said acquired image said interpreted to produce the master key is a captured image of the printed or displayed image of the exported representation of the master key. In one embodiment, the master key is immediately deleted from the apparatus after producing a first key in the progressive series of keys. One embodiment includes an image display; and display element configured for displaying images; wherein only images in the current session corresponding to the current key of the progressive series of keys can be decrypted for display. In one embodiment, the apparatus is configured: to initially generate the master key; to export a representation of the master key; and to import and interpret the representation of the master key to produce the master key for use in decrypting or authenticating, by said encryption mechanism, said encrypted or authenticated digital images.

One embodiment includes a method performed by a device including an image acquisition component, with the method comprising: obtaining a master key; exporting the master key out of the device; encrypting images or other data based on the master key or keys cryptographically derived from the master key; and storing said encrypted images or data in the device.

In one embodiment, said exported master key is one or more images representing the master key; wherein the image representing the master key can be acquired and interpreted by the device or another device in order to decrypt said encrypted images or data. In one embodiment, said one or more images representing the master key is in the form of a bar code. In one embodiment, said exported master key is an image representing the master key; and wherein method comprises: acquiring a digital image representing the master key; interpreting the digital image to recover the master key; and decrypting one or more of said stored encrypted images or data based on said recovered master key or keys cryptographically derived from said recovered master key. In one embodiment, said acquiring the digital image representing the master key includes taking a picture of a displayed or printed said image representing the master key. In one embodiment, the device is a digital still or movie camera. In one embodiment, the device is a laptop computer coupled to a digital camera.

One embodiment includes an apparatus, comprising: means for exporting a master key out of the apparatus as an image representing the master key, wherein the master key can be reliably computed from the image; means for capturing images; means for encrypting and decrypting images or other data based on the master key or keys cryptographically derived from the master key; means for storing said encrypted images or other data in the apparatus; and means for interpreting a particular image of said captured images to produce the master key for use by said means for encrypting and decrypting images or other data.

In one embodiment, said means for encrypting and decrypting images or other data includes means for generating said keys cryptographically derived from the master key using a cryptographic function to produce a one-way, progressive series of keys derived from a master key, wherein each of the progressive series of keys are the basis for encrypting images or other data in a different session of a plurality of sessions. In one embodiment, the apparatus is configured to delete a particular key of said previously used keys of said progressive series of keys derived from a master key at the end of a particular session of the plurality of sessions; wherein the particular key is for encrypting or decrypting images or other data during the particular session.

One embodiment includes a method performed by an image acquisition device, the method, comprising: acquiring a master key; exporting the master key out of the image acquisition device; generating a session key based on the master key using a cryptographic function of one or more cryptographic functions; and for each particular session of a plurality of sessions, performing each of operations (a) (b): (a) for one or more times during the particular session: capturing a particular image; encrypting the particular image based on the session key; and storing said encrypted particular image; and (b) at the end of the particular session, replacing the session key with a new session key using a cryptographic function of one or more cryptographic functions.

One embodiment includes generating a master key identifier to produce a different value for use in identifying whether or not an image of said stored images was encrypted based on the master key; and wherein operation (a) includes storing the different value with the particular image. In one embodiment, said operation (a) includes: generating a session key identifier to produce a particular value for use in identifying whether or not an image of said stored images was encrypted based on the session key; and storing the particular value with the particular image. One embodiment includes: acquiring a digital image of a representation of said exported master key; interpreting the digital image to produce the master key; generating one or more sessions keys based on said produced master key; and decrypting and displaying one or more of said stored encrypted includes decrypting and displaying said stored encrypted particular image based on said one or more session keys generated based on said produced master key. In one embodiment, said operation (a) includes decrypting and displaying said stored encrypted particular image based on the session key. In one embodiment, said operation (a) includes: generating a session key identifier using a cryptographic function on the session key to produce a particular value for use in identifying whether or not an image of said stored images was encrypted based on the session key; and storing the particular value with the particular image. One embodiment includes: acquiring a digital image of a representation of said exported master key; interpreting the digital image to produce the master key; generating one or more sessions keys based on said produced master key; and decrypting and displaying one or more of said stored encrypted particular images based on said one or more session keys generated based on said produced master key. In one embodiment, said exporting the master key out of the image acquisition device includes generating a bar code representation of the master key; and wherein the digital image includes a representation of said generated bar code. In one embodiment, said exporting the master key out of the image acquisition device includes generating a bar code representation of the master key. In one embodiment, said exporting the master key out of the image acquisition device includes generating a bar code representation of the master key; and wherein said acquiring the digital image includes taking a picture of a printout or display of the bar code representation of the master key.

Figure 1:
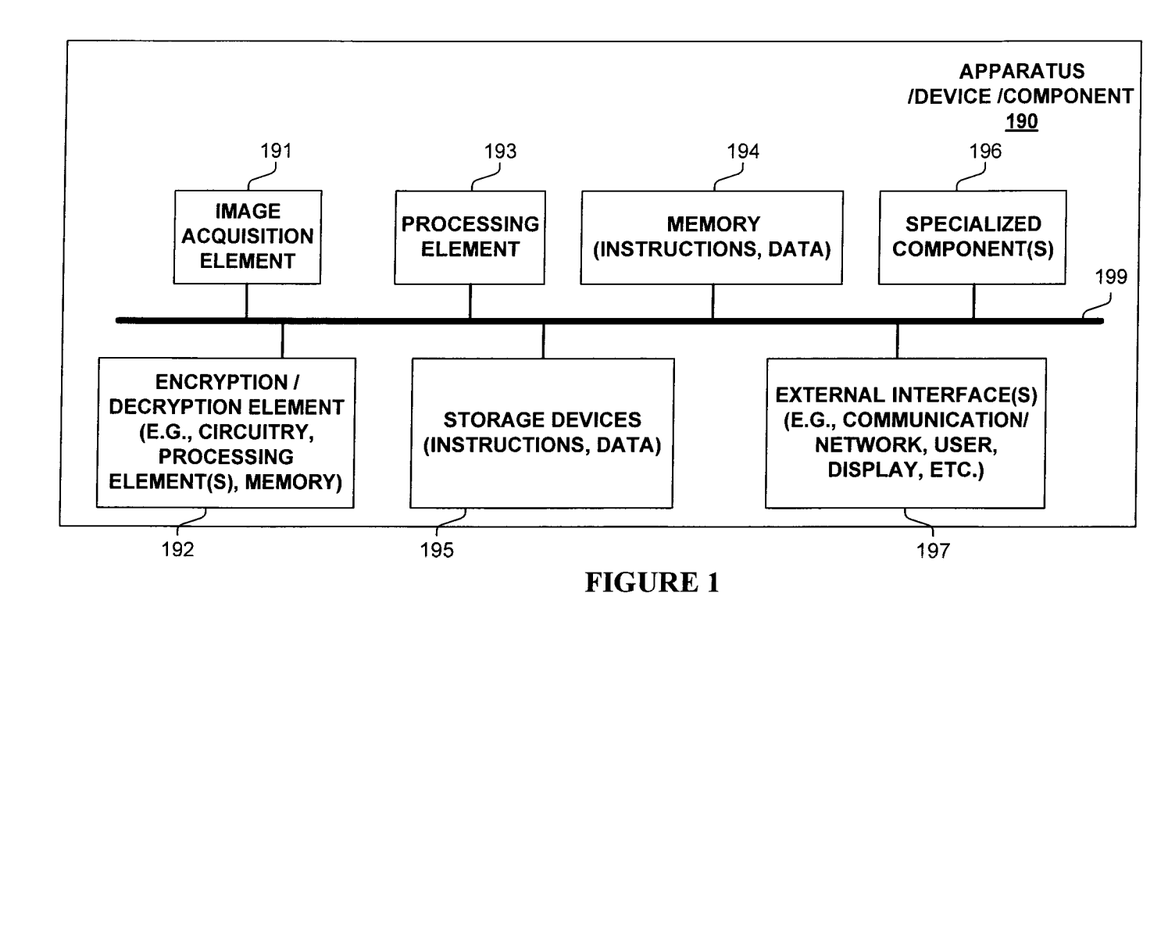
FIG. 1 illustrates a device with an image acquisition element according to one embodiment.

Expressly turning to the figures, FIG. 1 illustrates an exemplary apparatus (or component or device) 190 including an image acquisition element 191 used in one embodiment. For example, apparatus 190 may be used as an embodiment of a digital still or movie camera, a laptop or other computer coupled to a image acquisition element, etc.

Additionally, apparatus (or component or device) 190 can be used in one embodiment, but may or may not include all illustrated elements (e.g., may include processing element 193, memory 194 and/or storage devices 195 but not all other elements). Additionally, in one embodiment, apparatus (or component or device) 190 performs one or more processes corresponding to one of the flow diagrams illustrated or otherwise described herein.

In one embodiment, apparatus 190 includes an image acquisition element 191, a processing element 193, memory 194, storage devices 195, specialized components 196 (e.g. optimized hardware such as for performing operations, etc.), and interface(s) 197 for communicating information (e.g., communicating with other devices, user-interfaces, displays for displaying information, etc.), which are typically communicatively coupled via one or more communications mechanisms 199, with the communications paths typically tailored to meet the needs of the application. Additionally, one embodiment includes one or more encryption and/or decryption elements 192, which may be a standard processor and memory, or circuitry (possibly including a processor) specialized for performing encryption and/or decryption. Note, the encryption and decryption of one embodiment is performed by processing element 193 (e.g., without using a specialized encryption/decryption element 192). Additionally, in one embodiment, the operation of encryption and/or decryption element 192 is responsive to computer-readable and computer-executable instructions stored within encryption and/or decryption element 192, memory 194, and/or storage devices 195.

Various embodiments of apparatus (or component or device) 190 may include more or less elements. The operation of apparatus 190 is typically controlled by processing element 193 using memory 194 and storage devices 195 to perform one or more tasks or processes. Memory 194 is one type of computer-readable/computer-storage medium, and typically comprises random access memory (RAM), read only memory (ROM), flash memory, integrated circuits, and/or other memory components. Memory 194 typically stores computer-executable instructions to be executed by processing element 193 and/or data which is manipulated by processing element 193 for implementing functionality in accordance with an embodiment. Storage devices 195 are another type of computer-readable medium, and typically comprise solid state storage media, disk drives, diskettes, networked services, tape drives, and other storage devices. Storage devices 195 typically store computer-executable instructions to be executed by processing element 193 and/or data which is manipulated by processing element 193 for implementing functionality in accordance with an embodiment.

Figure 2A:
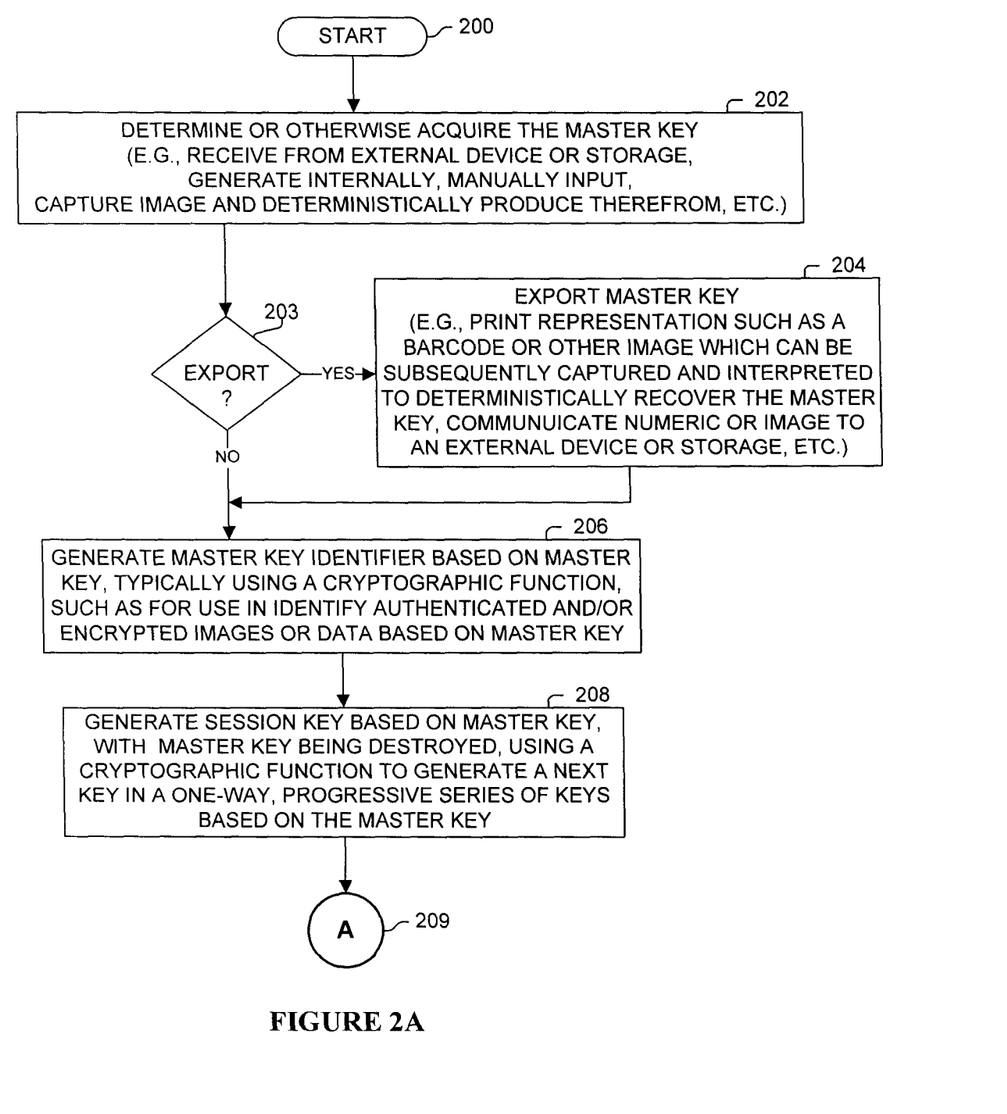
FIGS. 2A-B illustrates a process performed in one embodiment.
Figure 2B:
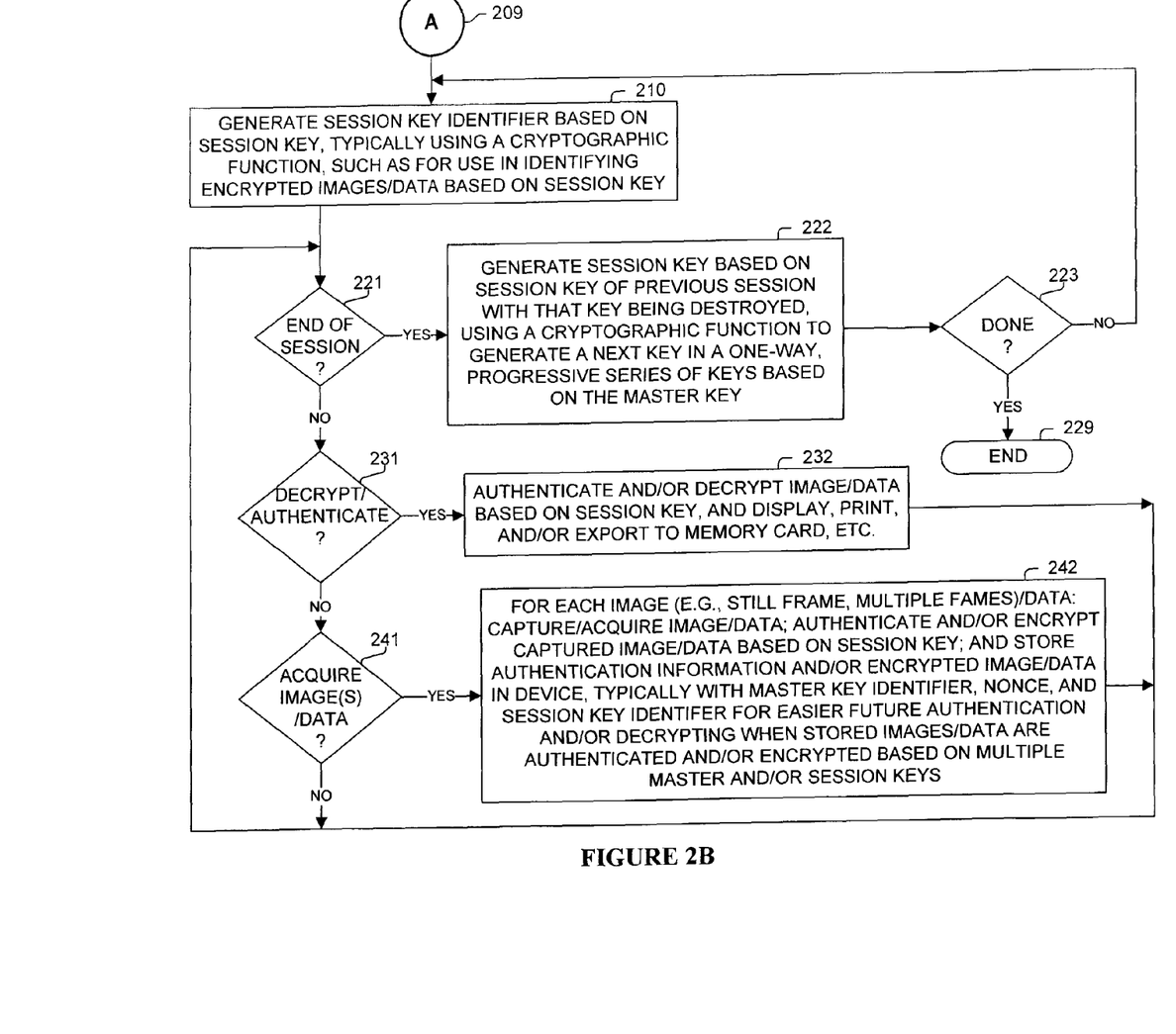

FIGS. 2A-B illustrates a process performed in one embodiment for use in protecting digital images or other data especially on a device communicatively coupled to an image acquisition device (e.g., a digital camera). In general, digital data, such as images on a digital camera, is typically protected (e.g., encrypted and/or authenticated) based on a master key stored off the device. The original master key can be acquired in a number of different ways, including being generated by the device or by another device. A one-way, progressive series of keys are derived from the master key such that only images or data of a same session can be decrypted for viewing, export or manipulation of the decrypted image/data. In order to decrypt images or data of a previous session on the device, the master key must be imported to the device, such as by, but not limited to, taking a picture of a representation of the key and interpreting the image to reacquire the master key. A representation of the master key may be produced by the device (e.g., an image such as a bar code representation of the master key), and stored in a safe place away from the device (e.g., left at home while traveling so that the data typically cannot be recovered until returning home).

Processing of the flow diagrams begins with process block 200 of FIG. 2A. In process block 202, the master key (e.g., a value such as 128 bits or some other length appropriate for use in encryption) is determined or otherwise acquired. For example, the master key could be received from another device (e.g., a different computer or storage device/memory card left at home during travel), be generated internally by the device, manually inputted, or otherwise deterministically determined. For example, one embodiment provides for one or more images to be acquired (e.g., take a picture thereof) of bar codes, product codes, inventory codes, text or titles of book(s), business cards, signs, text or other image displayed on a screen, etc., with these image(s) being interpreted to deterministically derive a master code for use. What is typically important when the key is acquired based on one or more images is that the device can acquire the one or more images and produce the same master code, at least upon initialization of the master code and upon desired decrypting of the images/data. (Note, that the master key can be acquired in one manner, and then exported by the device in a different format which can more readily be used to deterministically require the master key, such as discussed hereinafter associated with process block 204). Also, by associating the master code with a physical location or external sources, may only allow the images/data to be decrypted upon return to the location of that physical location or access to the source(s) (e.g., upon return home from a trip, the master key can be reacquired from a source left at home).

As determined in process block 203, if the master key is to be exported, then in process block 204, the master key is exported. For example, in one embodiment an image or other representation of the master key is printed or provided to another device or memory card, that can subsequently be interpreted to produce the master key. In one embodiment, this representation is a bar code (e.g., one or two dimensional). In one embodiment, this representation is a unique pattern which can be interpreted by the device. In one embodiment, this representation is a numeric value.

Next, in process block 206, a master key identifier is generated, typically using a cryptographic function. A device may store images/data encrypted and/or authenticated based on multiple master keys. One embodiment provides for an easy mechanism for identifying whether a master key was the basis of the encryption/authentication of an image or other data by producing a value typically unique to that master key, and then this master key identifier can be associated with the encrypted/authenticated images/data. A cryptographic function (e.g., $E_M(F)$, where M is the master key, F is a fixed but arbitrary constant, and the function E is a block cipher such as the Advanced Encryption Standard) is used in one embodiment to determine the master key identifier, such that the master key cannot be determined from the master key identifier. One embodiment simply uses a sequence number or other numeric or alphanumeric master key identifier. Note, a master key identifier, and possibly session key identifiers discussed herein, are not used in one embodiment, as they merely provide an efficient mechanism for verifying that an image/data was encrypted based thereon, and the image/data can be decrypted and then its integrity verified.

Next, in process block 208, a session key is generated based on the master key, with the master key being destroyed (e.g., overwritten, or otherwise unrecoverable). Typically, the session key is generated using a cryptographic function to generate a next session key in a one-way, progressive series of session keys based on the master key. In one embodiment, the session key is determined (e.g., the next session key can be computed as $E_S(F)$, where S is the previous session key, F is a fixed but arbitrary constant, and the function E is a block cipher such as the Advanced Encryption Standard). One embodiment uses as its fixed but arbitrary constant a nonce—a one-time acquired random value (easily obtained from data on a camera or computer) to provide additional protection for making it harder to recover the master key from the first session key by adding a random (or pseudo random) factor. The nonce is used, in one embodiment, to prevent the same key sequence from being generated more than once.

Now, the device is ready in one embodiment to encrypt/authenticate images/data in one embodiment for a first session. As used herein, a session refers to a grouping which encrypts/authenticates based on a same session key. In one embodiment, the images/data are natively stored in encrypted format. Therefore, in one embodiment, images and data within a current session can be decrypted with the decrypted image or data viewed, manipulated, and/or exported. Images/data within a previous session typically cannot be decrypted be the device until after requiring the master key, and sequencing through the one-way, progressive series of session keys to match the session key based on which a particular image/data was encrypted.

A device might use only a single session, in which case all images/data can be decrypted by the device. This scenario might be applicable to provide a means of validating the source of the image/data. For example, an employer might initialize the device with the master key, and then be able to verify that the images/data came from the device by subsequently decrypting the data using a reacquired master key, or exporting the encrypted images/data and decrypting them based on the master key with which it initialized the device. If the images/data properly decrypt based on the original master key, the images/data actually originated from the device.

In another embodiment, the device uses multiple sessions, with the definition of the session covering an extensible set of different approaches. For example, a session may be of a certain time duration, terminated in response to a manual designation or automatically in response to a time duration or event. For example, a session may end after a predetermined number of images (e.g., one, two, ten, fifty, etc.); after a predetermined time period of inactivity; in response to the device being turned off, powered down, or put into sleep mode; in response to a battery failure or low-battery warning; in response to the removal of a memory card; in response to a specific action (e.g., end session), etc.

Processing of the flow diagram illustrated in FIG. 2A continues with FIG. 2B as designated by connector A (209). In process block 210, a session key identifier is generated, typically using a cryptographic function (e.g., typically, in a same or similar manner to the master key identifier discussed in relation to process block 206 of FIG. 2A). A device may store images/data encrypted based on multiple session keys. One embodiment provides for an easy mechanism for identifying whether a session key was the basis of the encryption (or authentication) of an image or other data by producing a value typically unique to that session key, and then this session key identifier can be associated with the encrypted images/data. A cryptographic function (e.g., $E_{KS}(F) \oplus F$, where KS is the session key and F is a fixed, arbitrary constant) is used in one embodiment to determine the session key identifier, such that the session key cannot be determined from the session key identifier. One embodiment simply uses a sequence number or other numeric or alphanumeric session key identifier. Note, session key identifiers, and possibly the master key identifier discussed herein, are not used in one embodiment, as they merely provide an efficient mechanism for verifying that an image/data was encrypted based thereon, and the image/data can be decrypted and then its integrity verified.

Next, a while loop of processing is represented by process blocks 221-242 for a particular session. As determined in process block 221, when a session is determined to be over (e.g., such as described supra), then in process block 222, a new session key is generated based on the session key of the session just completed, with that session key being destroyed (e.g., overwritten or otherwise rendered unrecoverable). Typically, a cryptographic function is used to generated the next session key in the one-way, progressive series of sessions keys based on the master key. In one embodiment, a cryptographic function (e.g., $E_{KS}(F) \oplus F$, where KS is the session key of the session just completed, and F is a fixed, arbitrary constant) is used in one embodiment to determine the next session key identifier, such that the previous session key cannot be determined from the new, current session key. As determined in process block 223, if there are going to be no more sessions, then processing is complete as illustrated by process block 229. Note, in the case of no more sessions, a new session key does not need to be generated (as in process block 222), but that is an easy operation for deleting the session key of the session just ending and therefore performed in one embodiment. If there are to be more sessions, then processing returns to process block 210.

Otherwise, as determined in process block 231, if an image or data of the current session is desired to be decrypted or authenticated, then in process block 232, the image or data is decrypted and/or authenticated based on the session key, and then displayed, printed, exported, and/or manipulating, etc. Processing then returns to process block 221.

Otherwise, as determined in process block 241, if one or more images or data are acquired and need to be encrypted and/or authenticated for storage on the device, then in process block 242, each image (e.g., still frame, multiple frames) and/or data is encrypted and/or authenticated (e.g., a tag/message authentication code/integrity check value is created) based on the session key (e.g., using an Advanced Encryption Standard (AES) key Pk=$E_{SK}(G) \oplus G$, where SK is the current session key, and G is a fixed, arbitrary constant that is not equal to the constant F), and stored in the device. In one embodiment, the encrypted and/or authenticated image(s)/data and possibly authentication information are stored along with the master key identifier, nonce, and session key identifier for ease in matching the encrypted/authenticated data with corresponding the master key and session key as discussed herein. In one embodiment, the encrypted image(s)/data is not stored with this additional identification information. In one embodiment, a session key is further manipulated such different images/data within a session are encrypted with a different key but still encrypted based on the same session key. Furthermore, one embodiment provides for the storage of both non-encrypted and encrypted images/data. One such embodiment storing stores the non-encrypted images/data and encrypted images/data in different sections of storage in the device, so as not to provide any indications or characterizations thereof (e.g., time taken, number of images or data files, etc.). Processing returns to process block 221.

Figure 3:
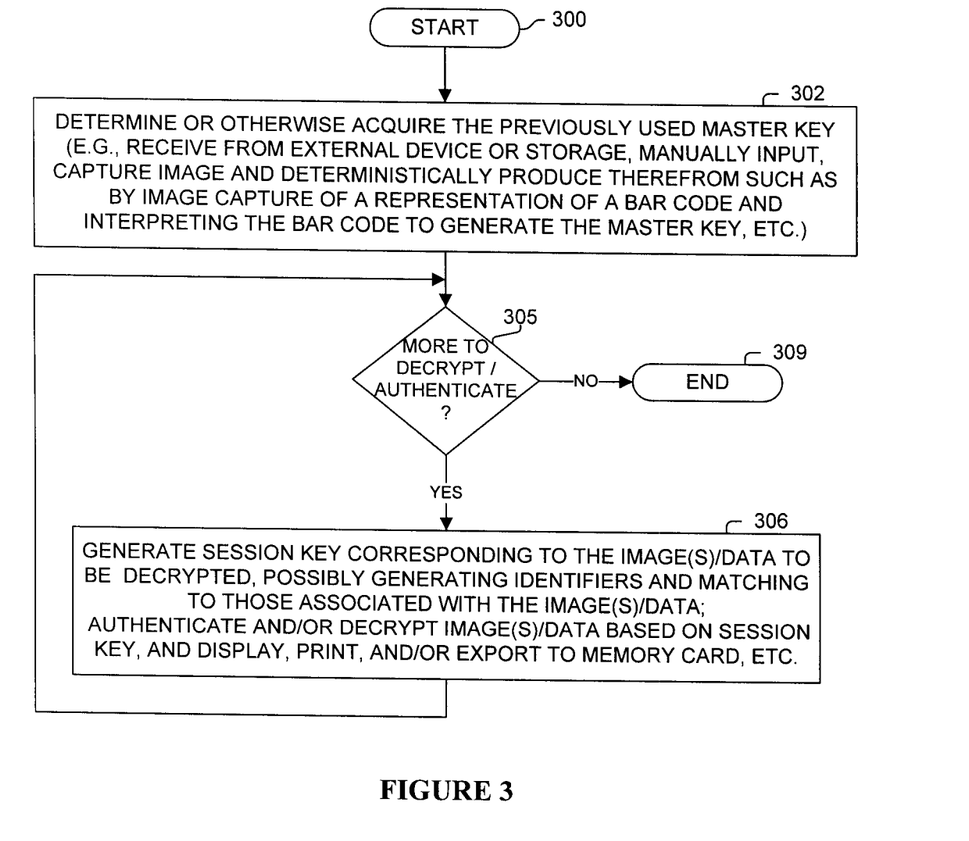
FIG. 3 illustrates a process performed in one embodiment.

FIG. 3 illustrates a process performed in one embodiment for acquiring a previously used master key, and decrypting image(s)/data based thereon. In one embodiment, this process is performed by the image acquisition device itself. In one embodiment, this process is performed by a computing device (which may or may not include an image acquisition device) for decrypting images, such as for use in viewing and/or other image manipulation, or for providing the decrypted images to another device. Processing begins with process block 300. In process block 302, the previously used master key is acquired, such as by, but not limited to, receiving from an external device or storage, manually being input, capturing an image of a representation (e.g., bar code, alphanumeric string and using optical character recognition, etc.) thereof and deterministically producing the master key therefrom, etc. The previously used master key can be efficiently found matched to images using by comparing the master key identifier of an image and of the master key.

As determined in process block 305, while there are more image(s)/data to decrypt and/or authenticate, in process block 306, generate a session key corresponding to the image(s)/data to be decrypted/authenticated, possibly generating identifiers and matching to those associated with the image(s)/data; decrypt and/or authenticate image(s)/data based on session key, and display, print, and/or export to memory card, etc. Processing then returns to process block 305. When there are no more image(s)/data to decrypt as determined in process block 305, then processing is complete as indicated by process block 309.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
    an image acquisition element configured for acquiring digital images;
    a processing element for interpreting one or more digital images of said acquired digital images to produce a master key;
    storage configured for storing data, including said digital images; and
    an encryption mechanism configured for generating, using a cryptographic function, a one-way, progressive series of keys derived from a the master key, and configured for encrypting or authenticating said digital images; wherein each particular key of the progressive series of keys is associated with a different session of a plurality of sessions, with said particular key being the basis for encrypting or authenticating images in said session associated with the particular key to produce encrypted or authenticated images.

2. The apparatus of claim 1, comprising an interface configured for exporting a representation of the master key which subsequently can be said acquired and said interpreted to produce the master key for use in decrypting or authenticating, by said encryption mechanism, said encrypted or authenticated digital images.

3. The apparatus of claim 2, comprising: an image display; and display element configured for displaying images; wherein images of said encrypted or authenticated images are decrypted or authenticated based on said master key produced by interpreting one or more acquired images of the exported representation of the master key.

4. The apparatus of claim 2, wherein said exported representation of the master key is an image; and wherein said acquired image is said interpreted to produce the master key is a captured image of the printed or displayed image of the exported representation of the master key.

5. The apparatus of claim 1, wherein the master key is immediately deleted from the apparatus after producing a first key in the progressive series of keys.

6. The apparatus of claim 1, comprising: an image display; and display element configured for displaying images; wherein only images in the current session corresponding to the current key of the progressive series of keys can be decrypted or authenticated for display.

7. The apparatus of claim 1, wherein the apparatus is configured: to initially generate the master key; to export a representation of the master key; and to import and interpret the representation of the master key to produce the master key for use in decrypting or authenticating, by said encryption mechanism, said encrypted or authenticated digital images.

8. A method performed by a device including an image acquisition component, the method comprising:
obtaining a master key;
generating, using a cryptographic function, a one-way, progressive series of keys derived from the master key, wherein each particular key of the progressive series of keys is associated with a different session of a plurality of sessions;
exporting the master key out of the device;
encrypting images based on the series of progressive keys derived from the master key; and
storing said encrypted images in the device;
acquiring a digital image representing the master key;
interpreting the digital image to recover the master key; and
decrypting one or more of said stored encrypted images based on said keys cryptographically derived from said recovered master key.

9. The method of claim 8, wherein said exported master key is one or more images representing the master key; wherein the image representing the master key can be acquired and interpreted by the device or another device in order to decrypt said encrypted images.

10. The method of claim 9, wherein said one or more images representing the master key is in the form of a bar code.

11. The method of claim 8, wherein said acquiring the digital image representing the master key includes taking a picture of a displayed or printed said image representing the master key.

12. A method performed by an image acquisition device, the method, comprising:
acquiring a master key, including interpreting one or more digital images to produce the master key;
generating a session key based on the master key using a cryptographic function of one or more cryptographic functions; and
for each particular session of a plurality of sessions, performing each of operations (a)-(b):
(a) for one or more times during the particular session: capturing a particular image; encrypting the particular image based on the session key; and storing said encrypted particular image; and
(b) at the end of the particular session, replacing the session key with a new session key using a cryptographic function of one or more cryptographic functions.

13. The method of claim 12, comprising: generating a master key identifier to produce a different value for use in identifying whether or not an image of said stored images was encrypted based on the master key; and wherein operation (a) includes storing the different value with the particular image.

14. The method of claim 13, wherein said operation (a) includes: generating a session key identifier to produce a particular value for use in identifying whether or not an image of said stored images was encrypted based on the session key; and storing the particular value with the particular image.

15. The method of claim 14, comprising:
exporting the master key out of the image acquisition device;
acquiring a digital image of a representation of said exported master key;
interpreting the digital image to produce the master key;
generating one or more sessions keys based on said produced master key; and
decrypting and displaying one or more of said stored encrypted includes decrypting and displaying said stored encrypted particular image based on said one or more session keys generated based on said produced master key.

16. The method of claim 12, wherein said operation (a) includes decrypting and displaying said stored encrypted particular image based on the session key.

17. The method of claim 12, comprising:
exporting the master key out of the image acquisition device;
acquiring a digital image of a representation of said exported master key;
interpreting the digital image to produce the master key;
generating one or more sessions keys based on said produced master key; and
decrypting and displaying one or more of said stored encrypted particular images based on said one or more session keys generated based on said produced master key.

18. The method of claim 17, wherein said exporting the master key out of the image acquisition device includes generating a bar code representation of the master key; and wherein said acquiring the digital image includes taking a picture of a printout or display of the bar code representation of the master key.

19. The method of claim 17, wherein for at least one of said particular sessions of the plurality of sessions: said one or more times includes at least two times.

20. The apparatus of claim 1, wherein at least one of the plurality of sessions includes a plurality of said digital images.

21. The apparatus of claim 1, wherein the apparatus is a digital camera.

22. The apparatus of claim 4, wherein the apparatus is a digital camera.

* * * * *

UNITED STATES PATENT AND TRADEMARK OFFICE
CERTIFICATE OF CORRECTION

PATENT NO. : 8,473,757 B2
APPLICATION NO. : 12/388387
DATED : June 25, 2013
INVENTOR(S) : Gladstone et al.

It is certified that error appears in the above-identified patent and that said Letters Patent is hereby corrected as shown below:

In the Claims:

Col. 10, Claim 1, line 50, replace "from a the master key," with -- from the master key, --

Col. 12, Claim 19, line 52, replace "claim 17," with -- claim 12 --

Signed and Sealed this
Third Day of September, 2013

Teresa Stanek Rea
*Acting Director of the United States Patent and Trademark Office*